United States Patent Office 2,840,530
Patented June 24, 1958

2,840,530
PREPARATION OF POROUS KAOLIN CATALYSTS

Thomas H. Milliken, Jr., Moylan, Pa., and Walter L. Weidman, Woodbury, N. J., assignors to Houdry Process Corporation, Wilmington, Del., a corporation of Delaware No Drawing. Application July 20, 1954
Serial No. 444,636

4 Claims. (Cl. 252—455)

It has heretofore been proposed to employ as contact masses in the catalytic conversion of hydrocarbons certain natural earths and clays, including kaolin-type clays, and it has further been proposed to prepare for this purpose larger aggregates from clay powder or the like by agglomerating such powder or the like to form pellets, tablets, coarse granules, and so on, well suited as catalysts in fixed or moving catalyst bed operations with or without pretreatment of said aggregates for removal of at least a substantial part of iron compounds generally contained in the raw clays.

It has also been proposed to remove at least most of the iron still contained in acid-treated clay or in kaolin-type clay not pre-treated in this manner by converting the iron compounds of the clay into acid soluble compounds. This is preferably achieved in accordance with the prior U. S. Patents 2,466,046; 2,466,047; 2,466,048; 2,466,049; 2,466,052, all of Hubert A. Shabaker, George Alexander Mills, and Ruth C. Denison, by subjecting said clay agglomerates to a treatment at elevated temperature with gases or vapors of a type reactive with the iron present in the treated clay. The use of a sulfiding agent, such as hydrogen sulfide, carbon disulfide in vapor form, or vaporous sulfur, is particularly suitable for this purpose. The thus formed iron sulfide or the like can then be removed from the clay under treatment by leaching the clay with dilute acid or the like or—in accordance with co-pending application (Serial No. 444,637 filed of even date herewith), by a treatment with ammonium chloride followed by purging with an inert gas or vapor.

It is an object of the present invention to increase the porosity of clay aggregates, such as pellets, tablets, or the like with an aim to make them more easily penetrable by hydrocarbon vapors during the cracking or reforming operation, and thereby to increase the catalytic activity of such clay aggregates.

And it is a further object of this invention to increase the porosity of clay aggregates, such as pellets, tablets, or the like for enhancing the penetrability of these aggregates during their treatment with gases or vapors in removing iron compounds present.

It is another object of this invention to obtain satisfactory hardness of clay aggregates, such as pellets, tablets, or the like to reduce the amount of catalyst loss by breakage during subsequent use.

Other objects and advantages of the invention appear from the following specification and the annexed claims.

In accordance with the present invention, powdered clay, in raw state or after an initial acid treatment, particularly finely divided or powdered kaolin-type clay is mixed with a substantial amount of a finely divided or powdered combustible organic material, such as wood flour, or other cellulosic fibrous material, powdered petroleum coke, starch, carbon black, or the like, or with several of such materials combined, so that an intimate and substantially uniform mixture of the combustible materials with the clay particles is obtained.

The powder mixture thus prepared is then agglomerated and the aggregates formed are heated to a temperature suitable for burning out the organic additives from the aggregates.

The thus produced highly porous clay material may be used directly for catalytic purposes. Apart from its higher porosity, the resulting material unexpectedly possesses higher hardness than a clay of the same origin shaped into aggregates and calcined without the use of a temporary admixture of combustible organic material. Thus, aggregates obtained in accordance with the present invention are more resistant against crumbling and disintegration into powder, particularly in their use as conversion catalysts, than aggregates prepared in known manner without the addition of combustible material.

An admixture of about 5% to 12% by weight as wood flour, and preferably of about 8% to 10% thereof, or of a corresponding amount on a volumetric basis of other combustible organic materials suitable to obtain corresponding porosity, is advisable to attain best results. Generally speaking the amount of combustible organic material to be admixed to the clay, based on particle density, should preferably be such that the volume ratio of said organic material to clay will not be less than about 0.15 to 1.0 and not greater than about 0.5 to 1.0.

For removing at least a substantial part of the iron still present in the porous clay aggregates obtained, any process suitable for this purpose may be employed, for instance any of those processes described in the above-named prior U. S. patents, particularly by subjecting the said porous aggregates to a sulfiding action by treatment with hydrogen sulfide or the like at a temperature of at least 1200° F. but insufficient to effect substantial incipient fusion of the clay. If desired, the heating of the aggregated mixture of clay particles and powdered combustible organic material for burning out said material may be combined with said sulfiding treatment or the like, the aggregates being made highly porous by the combustion of the organic admixture in the beginning of the heating of said aggregates to a temperature of at least 1200° F., whereupon the hydrogen sulfide or other sulfiding or other treating gas or vapor will quickly and thoroughly permeate into and through the highly porous aggregates thus obtained. The subsequent treatment of the sulfided or otherwise treated clay aggregates for removing therefrom the iron compounds formed, as particularly ferric sulfide, is also quickened and made more complete by the highly porous nature of the aggregates in accordance with this invention. In this subsequent treatment, the iron compounds formed may either be leached out of the cooled material with acid, followed by washing with water and drying the aggregates, or by treating said sulfided clay aggregates with ammonium chloride vapors at an elevated temperature sufficient to vaporize ferric chloride formed in said treatment but insufficient to decompose the ammonium group of the ammonium compounds present with formation of free hydrogen which could reduce the easily volatilizing ferric chloride and form difficultly volatile ferrous chloride.

It is also possible to prepare highly porous kaolin-type clay aggregates in accordance with the present invention while using very small clay particles, preferably of a size of 2 microns and less, as obtained in accordance with co-pending patent application Serial No. 444,638, filed of even date herewith. The aggregates obtained by mixing a kaolin-type clay having at least preponderantly a particle size not greater than 2 microns, with wood flour or other combustible material in the above named proportions, shaping the mixture to pellets or the like, and heating these aggregates to burn out said combustible materials, show equally good properties as other clay aggregates produced in accordance with the present invention, combined with the property of increased catalytic activity caused by the very small sized selected single particles of the plastic kaolin-type clay.

*Example I*

100 parts by weight of kaolin-type clay are intimately mixed in finely powdered state with 9 parts by weight of wood flour within a mechanical mixing device. From the intimate mixture obtained a thick paste is formed by admixture of an amount of water or other suitable inert liquid sufficient for this purpose. The thick paste is extruded into strands approximately 4 mm. in diameter and thereafter cut into cylinders approximately 4 mm. in length. After drying the resulting aggregates at a temperature of about 150° F., they are heated in an oxidizing atmosphere to a temperature high enough to burn out the wood flour particles but not sufficient to effect substantial incipient fusion of the clay, for instance to a temperature high enough to burn out the wood flour particles but not sufficient to effect substantial incipient fusion of the clay, for instance to a temperature of about 1400° F. for 4 hours within a stream of dry air. The material is thus simultaneously made highly porous and calcined.

*Example II*

An intimate mixture of 100 parts by weight of kaolin-type clay particles, 5 parts by weight of wood flour and 5 parts by weight of petroleum coke is compressed in dry state in a pelleting machine. The resulting pellets or aggregates are further treated about in the manner described in Example I.

*Example III*

A finely divided plastic kaolin-type clay is mixed with about 10% by weight of wood flour and shaped to larger aggregates in the manner described in Example I. The resulting aggregates are heated in a stream of air to a temperature of about 1500° F. preliminarily to burn out the wood flour, and thereafter a stream of a mixture of 25% hydrogen sulfide and 75% nitrogen is passed over said heated aggregates for at least two hours. The iron contained in the clay is transformed thereby totally or at least to a major part into ferric sulfide. The resulting sulfide highly porous aggregates are treated to convert the sulfide to the oxide (ferric), and are then treated with a mixture of ammonium chloride vapors and nitrogen at a temperature of about 850° F. for about two hours at a vapor pressure of about 300 mm. Hg of $NH_4Cl$ and at a velocity of flow of the vapor-gas mixture of about five liters per minute per liter of catalyst being treated. Thereupon, the treated aggregates are purged at a temperature of about 950° F. by an inert gas to remove the ferric chloride formed by the ammonium chloride treatment, together with excess ammonium chloride still present and ammonium hydroxide not formed in the reaction and not previously removed. The catalyst thus obtained, if desired after further calcining at a temperature of about 1500° F., on analysis shows an iron content of 0.16% by weight calculated as $Fe_2O_3$, while the untreated clay had a content of 0.73% by weight of $Fe_2O_3$.

*Example IV*

Several catalyst masses were prepared from plastic kaolin in substantially the same manner as described in Example I except that the amount of wood flour employed ranged from zero to 20% by weight of the dry clay basis.

The results appear in the following table.

| Catalyst | Wt. Percent Wood Flour | Porosity [1] | Hardness [2] | Activity (Cat-A Gaso.) |
|---|---|---|---|---|
| A | 0 | 38 | 79 | 23.8 |
| B | 6 | | 89 | |
| C | 8 | 42 | 94 | 24.8 |
| D | 10 | 44 | 87 | 24.9 |
| E | 20 | 52 | 72 | 21.6 |

[1] Determined as the percent of intra pellet voids by water absorption.
[2] Percent of charged material, larger than 5 mesh U. S. Std. screen, retained on 6 mesh screen after rolling with steel balls in a closed container for 1 hour.

Obviously, many modifications and variations of the invention as hereinbefore set forth may be made without departing from the spirit and scope thereof, and, therefore, only such limitations should be imposed as are indicated in the appended claims.

What is claimed is:

1. A process of preparing granular particles of stable catalysts having a Cat-A activity greater than 20 from kaolin-type clay which comprises intimately mixing said kaolin-type clay in finely divided form with from about 5% to about 12% by weight, corresponding to at least 0.15 and not more than 1.0 volume ratio, of wood flour, forming the resulting mixture into granular particles, heating said granular particles in an oxidizing atmosphere, whereby, said wood flour is burned out at a temperature of about 1500° F., well below the fusion temperature of said clay, and recovering said heated granular particles as hard, porous active and stable catalyst particles capable of selectively promoting formation of gasoline during the cracking of higher boiling hydrocarbons.

2. A process in accordance with claim 1, wherein an amount of 8% to 10% by weight of wood flour is admixed to said clay.

3. A process of preparing granular particles of stable hydrocarbon conversion catalysts from kaolin-type clay which comprises intimately mixing said kaolin-type clay in finely divided form with at least 0.15 and not more than 1.0 volume ratio of wood flour, said wood flour constituting from about 5% to about 12% by weight, forming the resulting mixture into granular particles and heating said particles in an oxidizing atmosphere to burn out said wood flour at a temperature of about 1500° F., well below the fusion temperature of said clay, thereafter treating the resulting highly porous clay particles at a temperature of at least about 1200° F., but well below the fusion temperature of the clay, with a chemical reagent in gaseous form reactive with iron contained in said clay to form acid soluble iron salts, leaching out the formed iron salts, drying and calcining the resulting particles to provide catalyst particles selectively promoting the formation of gasoline during the cracking of higher boiling hydrocarbons.

4. A process in accordance with claim 3, wherein the highly porous clay aggregates are treated at a temperature of about 1500° F. with a sulfiding agent in a gaseous form for a period of time sufficient to transform at least a major part of the iron compounds of said clay into ferric sulfide and thereupon treating the resulting product to remove said ferric sulfide.

References Cited in the file of this patent

UNITED STATES PATENTS

| | | |
|---|---|---|
| 1,783,396 | Traverse et al. | Dec. 2, 1930 |
| 1,839,059 | Tellier | Dec. 29, 1931 |
| 1,966,362 | Stockton | July 10, 1934 |
| 1,966,363 | Stockton | July 10, 1934 |
| 2,466,048 | Shabaker et al. | Apr. 5, 1949 |